United States Patent [19]

Nagano et al.

[11] Patent Number: 4,668,997
[45] Date of Patent: May 26, 1987

[54] RECORDING AND REPRODUCING SYSTEM FOR COLOR VIDEO SIGNAL

[75] Inventors: Masahiko Nagano; Naoaki Sakaki, both of Kanagawa, Japan

[73] Assignee: Fuji Photo Film Co., Ltd., Kanagawa, Japan

[21] Appl. No.: 694,042

[22] Filed: Jan. 23, 1985

[30] Foreign Application Priority Data

Jan. 24, 1984 [JP] Japan .................................. 59-9447

[51] Int. Cl.⁴ .......................... H04N 9/89; H04N 9/88
[52] U.S. Cl. .................................. 358/323; 358/134; 358/330
[58] Field of Search ............... 358/310, 323, 330, 320, 358/314

[56] References Cited

U.S. PATENT DOCUMENTS

| 3,968,513 | 7/1976 | de Haan ............................. 358/323 |
| 4,163,247 | 7/1979 | Bock et al. ......................... 358/310 |
| 4,400,742 | 8/1983 | Tamamitsu et al. ............... 358/323 |
| 4,520,401 | 5/1985 | Takahashi et al. ................. 358/310 |

Primary Examiner—Donald McElheny, Jr.

[57] ABSTRACT

A color video signal recording system in which a quadrature two-phase balance-modulated color signal is produced by subjecting a subcarrier to quadrature two-phase balanced modulation by two color signals; and a demodulation-purpose reference phase signal is produced which has the same frequency as that of the subcarrier and which is to be frequency-interleaved with the quadrature two-phase balance-modulated color signal. The quadrature two-phase balance-modulated color signal and the demodulation-purpose reference phase signal together with a carrier luminance signal are multi-plexed and the multiplex signal recorded.

3 Claims, 19 Drawing Figures

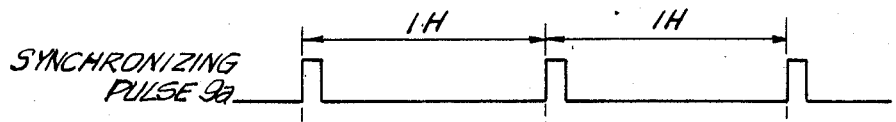
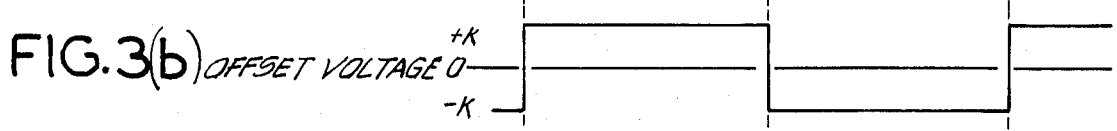
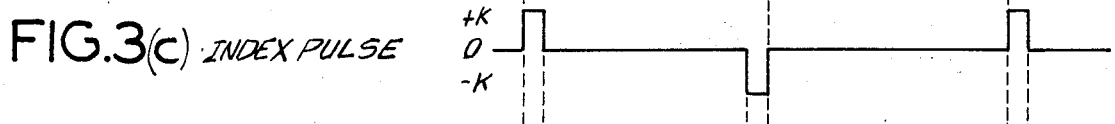
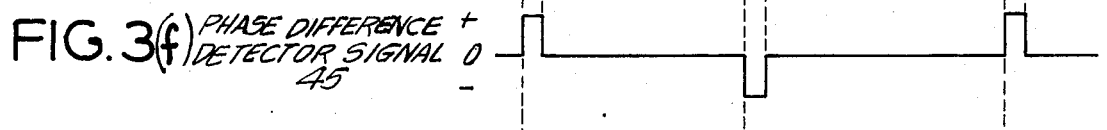
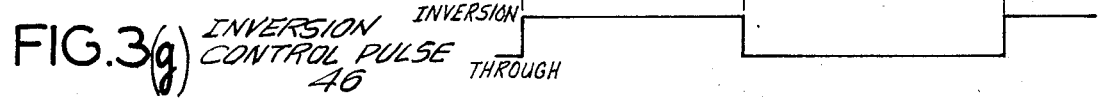
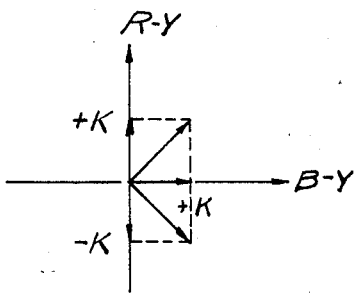
FIG. 4

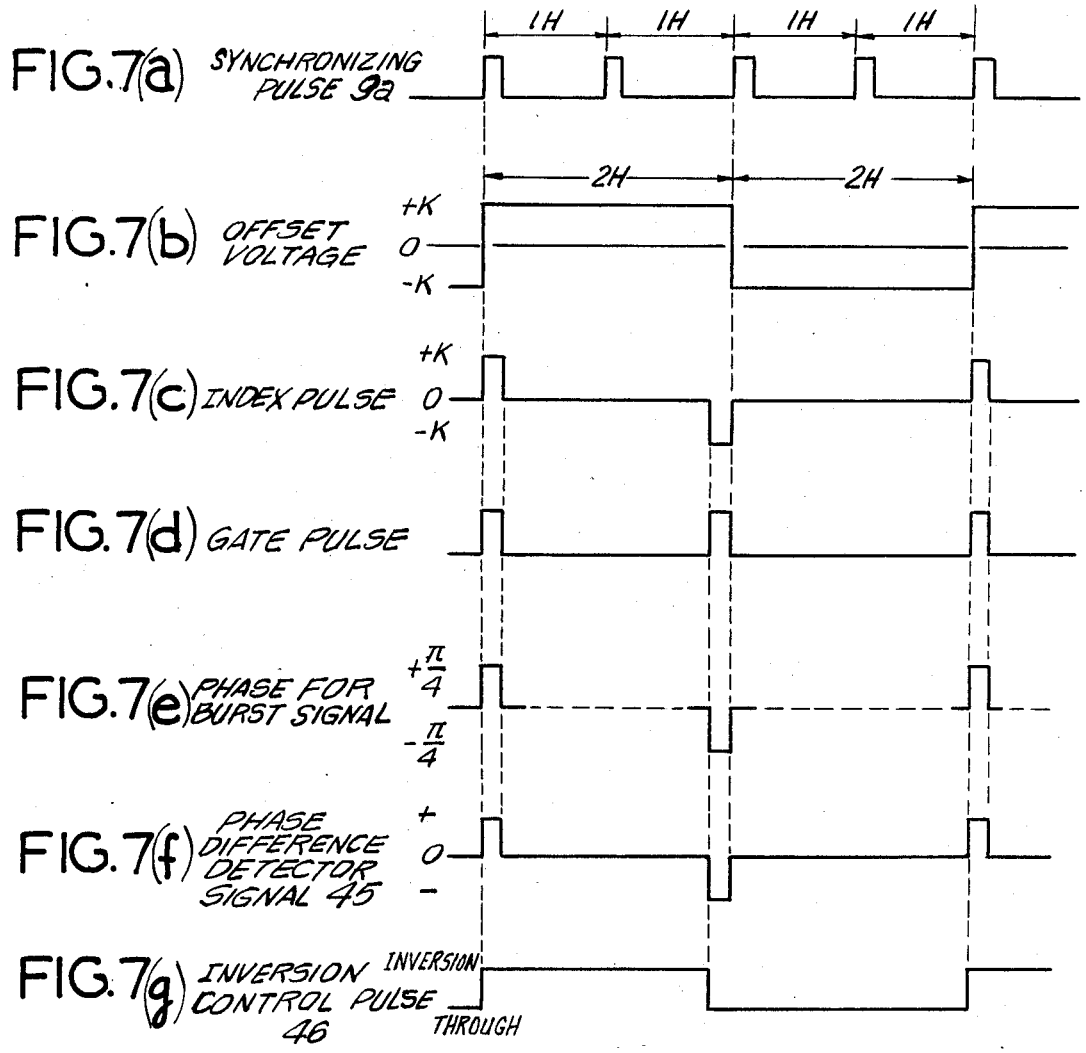

RECORDING AND REPRODUCING SYSTEM FOR COLOR VIDEO SIGNAL

BACKGROUND OF THE INVENTION

This invention relates to a recording and reproducing system for color video signals, and more particularly to an improved chroma signal recording and reproducing system which minimizes deviation of hues from the original as well as that of color saturation from the original and eliminates drop-out or missing of color information, thereby ensuring a high quality of reproduced pictures.

Various types of chroma signal recording and reproducing systems have hitherto been proposed. Two types of the low-band conversion type and the color-difference line-sequential FM type are typical of those commonly employed in a magnetic picture recording and reproducing apparatus for commercial use such as video tape recorders. The basic principle, merits and demerits of these two types will now be described.

(1) Low-band conversion type:

According to this type, a subcarrier is subjected to quadrature two-phase balanced modulation by two color difference signals to obtain a modulated chrominance signal commonly used in the NTSC system or PAL system, the frequency band of the chrominance signal being then converted into that lower than the FM band of a luminance signal, and this low-band converted chrominance signal is superposed on the FM luminance signal to be recorded together with the luminance signal. In the playback mode, the low-band converted chrominance signal is separated from the reproduced signal to be then restored to the original high-band chrominance signal by a frequency converter.

Therefore, the low-band conversion type exhibits the following merits (a-1) to (a-4) among others.

(a-1) By virtue of the quadrature two-phase balanced modulation, two color difference signals can be recorded in multiplex without widening the frequency band occupied.

(a-2) There occurs a time base variation in the reproduced signal when the speed of the magnetic recording medium moving relative to the magnetic head varies. Because this time base variation causes merely a phase variation of the chrominance signal of a low frequency, the frequency band conversion after reproduction of the chrominance signal into its original high-frequency band alleviates the effect of the time base variation.

(a-3) The simple procedure of converting the frequency band of the chrominance signal is merely required for recording and reproducing color TV signals used in the NTSC system or PAL system.

(a-4) As the carrier chrominance signal is provided by modulation according to an AM mode, no beat interference occurs even when adjoining two tracks are scanned simultaneously by the magnetic head in the playback mode, and crosstalk can be easily eliminated by means of phase shift (PS) or phase inversion (PI). Thus, this type is suitable for guardband-less recording.

On the other hand, the low-band conversion type has demerits listed below.

(b-1) Since modulation is according to an AM mode, a level variation occurring in the reproduced signals cannot be removed, resulting in deviation of color saturation from the original.

(b-2) Since the carrier chrominance signal does not include the carrier component, a continuous reference carrier having the same frequency and phase must be provided and used for synchronous detection during demodulation of the color signal. However, when a time base variation is present in the reproduced chrominance signal, the reference carrier fails to completely follow up the time base variation resulting in deviation of hue from the original, even when, an APC circuit is incorporated to produce the reference carrier on the basis of the color burst signal.

(b-3) Since the low-band converted color signal is superposed on the FM luminance signal to be recorded together, when a distortion of third order typical of magnetic recording appears in the recording and reproducing system, a beat interference (moire) due to cross modulation appears in the reproduced luminance signal. In order to alleviate this moire interference, it is necessary to select the frequency of subcarrier converted into the low band at a special value to utilize the interleaving effect or to precisely restrict the level of the low-band converted color signal relative to the FM luminance signal.

In regard to the level variation discussed in (b-1), incorporation of a conventional AGC circuit which controls the gain on the basis of the detected burst level is effective for compensation of sensitivity difference between magnetic heads and for correction of the mean level in each field. However, it has been difficult for the AGC circuit to suppress an instantaneous level variation.

(2) Color-difference line-sequential FM type:

According to this type, two color difference signals are subjected to frequency modulation (FM), and FM color difference signals are alternately recorded at a time interval of one horizontal scanning period (1H). In the playback mode, in lieu of the color difference signal omitted in the record mode, the signal is obtained by delaying the reproduced signal by 1H.

This color-difference line-sequential FM type exhibits the following advantages (c-1), (c-2). (c-1) By the use of frequency modulation (FM), a level variation which may occur can be removed by a limiter, and any deviation of color saturation does not occur. (c-2) Similarly by the use of the frequency modulation, hue deviation does not occur even in the presence of a time base variation.

On the other hand, the color-difference line-sequential FM type has the following disadvantages of (d-1), (d-2).

(d-1) According to its basic principle, the color signal information drops out at alternate horizontal scanning line. Therefore, the vertical resolution of color becomes degraded.

(d-2) Since the frequency band used for recording FM color signals is generally set to be lower than the FM band of the luminance signal, even when an inclined azimuth arrangement is employed, simultaneous scanning the adjoining two tracks by the magnetic head results in beat interference. Therefore, this is not suitable for guardband-less recording, and it is difficult to increase the recording density.

SUMMARY OF THE INVENTION

In order to obviate the problems of the prior art listed above, the present invention aims to provide a recording and reproducing system for color video signal which eliminates drop-out of color information, as experienced with the color-difference line-sequential FM type, without widening the occupied frequency band, and which reduces deviations of hue and color saturation to less than those experienced with the low-band conversion type even in the presence of a time base variation and a level variation, thereby ensuring reproduction of high quality pictures.

According to the present invention, there is provided a color video signal recording system comprising means for producing a quadrature two-phase balance-modulated color signal by subjecting a subcarrier to quadrature two-phase balanced modulation by two color signals, means for producing a demodulation-purpose reference phase signal which has the same frequency as that of the subcarrier and which is to be frequency-interleaved with the quadrature two-phase balance-modulated color signal, means for multiplexing the quadrature two-phase balance-modulated color signal and the demodulation-purpose reference phase signal together with a carrier luminance signal, and means for recording them.

In accordance with another aspect of the present invention, there is provided a system for reproducing a color video signal recorded on a medium, the color video signal being provided by multiplexing a quadrature two-phase balance-modulated color signal obtained by subjecting a subcarrier to quadrature two-phase balanced modulation by two color signals and a demodulation-purpose reference phase signal which has the same frequency as that of the subcarrier and which is to be frequency-interleaved with the quadrature two-phase balance-modulated color signal, together with a carrier luminance signal, means for separating the carrier luminance signal, the quadrature two-phase balance-modulated color signal and the reference phase signal from the demodulated signal, and means for demodulating the quadrature two-phase balance-modulated color signal on the basis of the separated reference phase signal.

The basic principle and advantages of the present invention are described below.

(i) In order to eliminate deviation of hues from the original caused by a time base variation, a continuous reference phase signal for synchronous detection is previously multiplexed with the quadrature two-phase balance-modulated color signal to be recorded. Since the reproduced reference phase signal is also affected by a time base variation similarly as the reproduced quadrature two-phase balance-modulated color signal, this reproduced reference phase signal is utilized for demodulation of the color signal, so that the time base variations can be cancelled to eliminate hue deviation. In this case, the frequency fr of the reference phase signal is selected to be equal to the subcarrier frequency fc of the quadrature two-phase balance-modulated color signal so as not to widen the occupied frequency band and to cause the time base variation occurring in the reference phase signal to coincide with that of the quadrature two-phase balance-modulated color signal as much as possible. However, in order that the quadrature two-phase balance-modulated color signal and the reference phase signal can be separated from each other during reproduction, the phase of, for example, the reference phase signal is inverted at a time interval of 1H for the purpose of frequency interleaving of the two signals.

(ii) As the reference phase signal multiplexed with the quadrature two-phase balance-modulated color signal is continuous, it is possible to control the level variation of color signals by applying AGC with the signals obtained from the reference phase signal by envelope detection.

In the low band conversion system of the prior art, an APC circuit must comprise of burst signals, which feature determines the performance in respect of the time based variation. Whereas in the present invention, the continuous reference phase signal eliminates the need for APC, and the quadrature two-phase balance-modulated color signal and the reference phase signal share the same time base variation, thereby proving sufficiently resistant against time based variation.

BRIEF DESCRIPTION OF THE DRAWINGS

FIGS. 3(a) to 3(g) show operating waveforms appearing at various parts of FIGS. 1 and 2.

FIG. 4 shows the phase relationship of the index pulse signal.

FIGS. 7(a) to 7(g) show operating waveforms appearing at various parts of FIGS. 4 and 6 when $$\omega_c = \frac{2n+1}{4} \omega_H. \qquad (1)$$

DETAILED DESCRIPTION OF PREFERRED EMBODIMENTS

Figure 1:
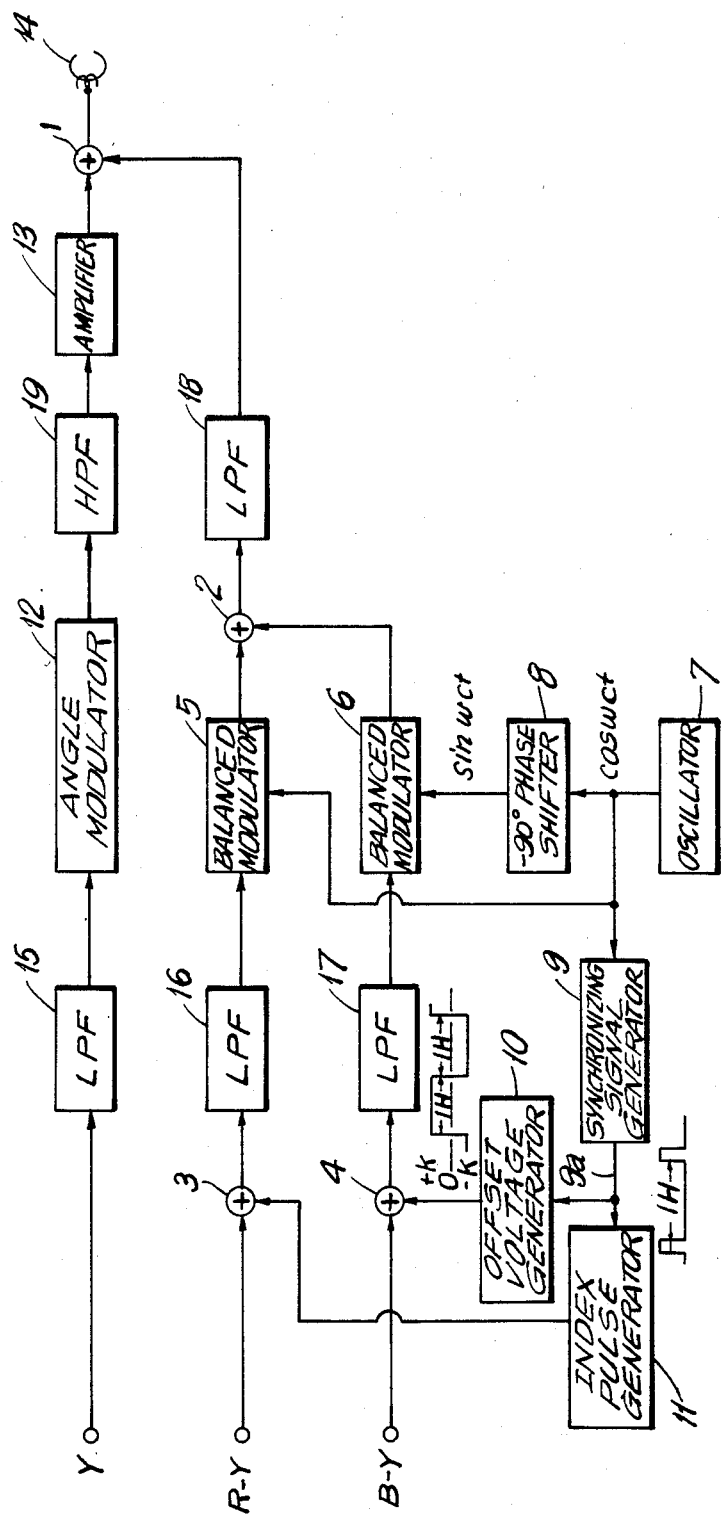
FIG. 1 is a block diagram showing an embodiment of the present invention system.

The embodiment of the present invention is now described in further detail referring to the drawings.

Figure 2:
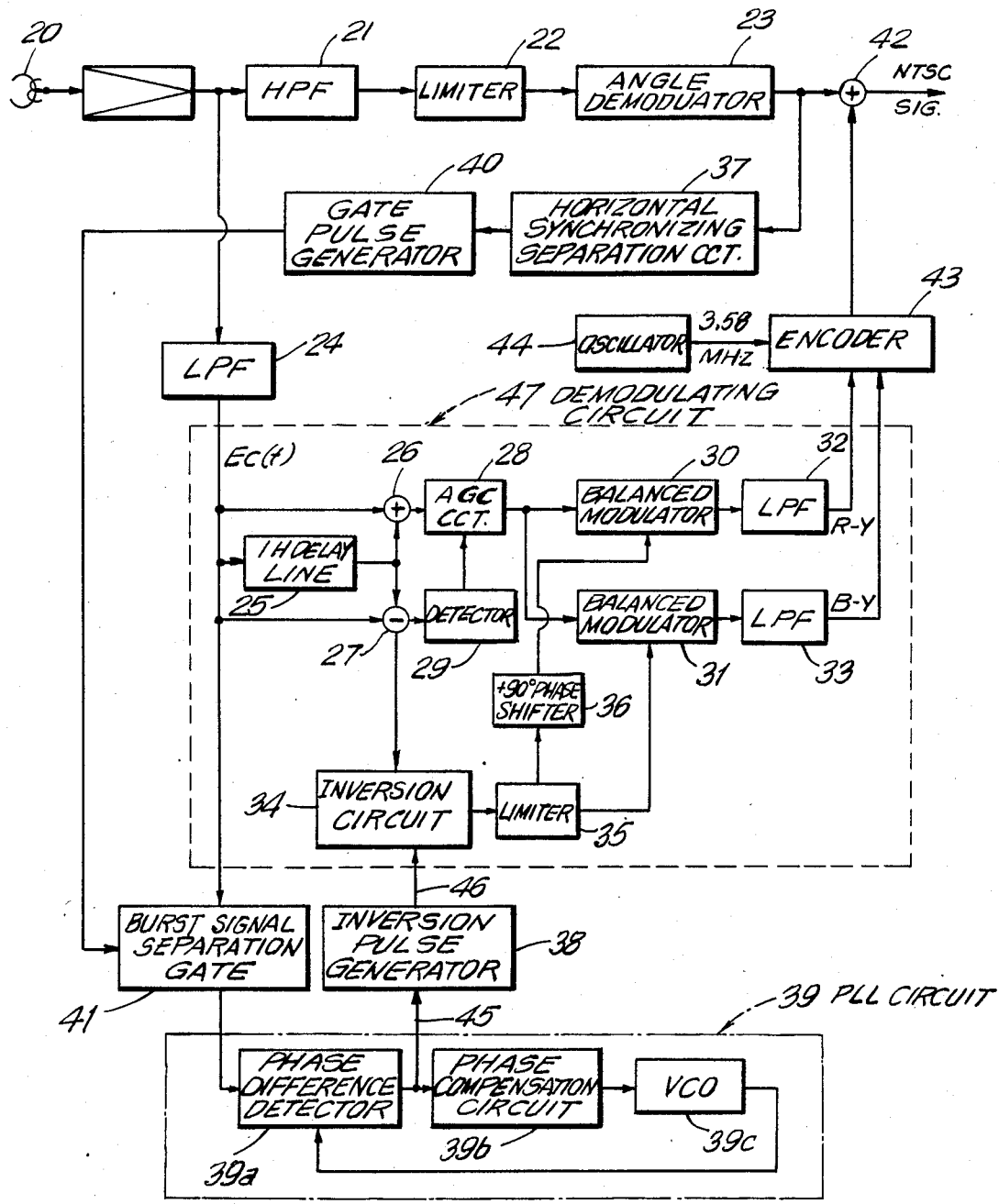
FIG. 2 is a block diagram showing an embodiment of the reproducing system according to the present invention.
Figure 5:
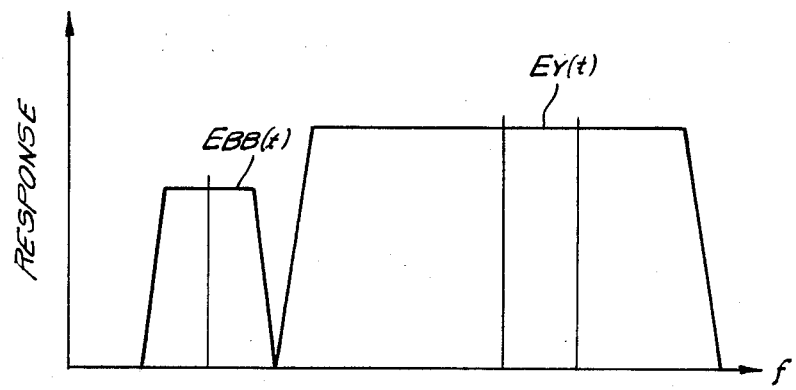
FIG. 5 shows allocation of signals in the above embodiment.

An embodiment of the present invention as applied to a magnetic video recording and reproducing apparatus will now be described. FIG. 1 is a circuit diagram of, the recording system, FIG. 2 is a circuit diagram of the reproducing system, FIG. 3 shows operating waveforms appearing at various parts, FIG. 4 illustrates the phase of the index pulse, and FIG. 5 illustrates the frequency allocation of signals in the present embodiment. In the embodiment of the present invention, color difference signals R-Y and B-Y are used as two color signals.

Referring to FIG. 1, the symbol Y designates a luminance signal, and symbols R-Y and B-Y color difference signals respectively. Reference numbers 1, 2, 3 and 4 denote addition circuits; 5 and 6 balanced modulators for the quadrature two-phase balanced modulation; 7 and 8 an oscillator for generating the subcarrier and a 90° phase shifter respectively; 9a standard signal generator; 10 an offset voltage generator for producing the reference phase signal; 11 an index pulse generator; 12 an FM or PM angle modulator; 13 a recording amplifier; 14 a recording magnetic head; 15, 16, 17 and 18 low-pass filters; and 19 a high-pass filter.

On the other hand, reference numbers in FIG. 2 respectively denote the following: 20 a reproducing magnetic head; 21 a high-pass filter for separating the luminance signals; 22 a limiter; 23 an angle demodulator; 24 a low-pass filter for separating the composite signal including the reference phase signal and the quadrature two-phase balance-modulated color signal; 25 a 1H delay line; 26 an addition circuit; and 27 a subtraction circuit. These 25, 26 and 27 separate the reference phase signal and the quadrature two-phase balance-modulated color signal. Reference number 28 denote an AGC circuit; 29 a circuit for detecting the level of the reference phase signal; 30 and 31 synchronous detection circuits each using a balanced modulator; 32 and 33 lowpass filters; 4 an inversion circuit; 35 a limiter; and 36 a +90° phase shifter. These 34, 35 and 36 produce a carrier used for synchronous detection. Reference number 37 denote a horizontal synchronizing signal separation circuit; 38 an inversion pulse generator; 9 a PLL circuit; 40 a gate pulse generator; and 41 a burst signal separation gate. These 38, 39, 40 and 41 control the inversion circuit 34. Reference number 42 denotes an addition circuit; 43 an encoder; and 44 a 3.58 MHz oscillator. These 42, 43 and 44 produce an NTSC signal.

Assuming that the angular frequency of oscillation of the subcarrier oscillator 7 is $\omega c$, the balance-modulated wave of one of the color difference signals or color difference signal R−Y is given by $$E_{R-Y}(t) \cos \omega_c t$$

and that of the other color difference signal B−Y is given by $$E_{B-Y}(t) \sin \omega_c t$$

The composite signal $E_{BB}(t)$ of these two signals provides the quadrature two-phase balance-modulated color signal as follows:

$$E_{BB}(t) = E_{R-Y}(t)\cos \omega c t + E_{B-Y}(t)\sin \omega c t \quad (2)$$

where
$E_{R-Y}(t)$ is the voltage signal wave of R−Y, and
$E_{B-Y}(t)$ is the voltage signal wave of B−Y.
Assuming that the angular frequency $\omega_r$ of the reference phase signal is selected to be $$\omega r = \omega c \quad (3)$$

and the phase of the reference phase signal is inverted by 1H, the reference phase signal and the quadrature two-phase balance-modulated color signal $E_{BB}(t)$ are frequency-interleaved and can be separated from each other even after multiplexion.

Any method may be employed for multiplexing the reference phase signal. In the embodiment shown in FIG. 1, an offset voltage is added to one of the color difference signals, i.e. B−Y, to realize multiplexing and frequency interleaving. More precisely, in response to the output of the subcarrier generator 7, the standard signal generator 9 generates a synchronizing pulse signal 9a having a period of 1H as shown in FIG. 3(a), and in response to the pulse signal 9a, the offset voltage generator 10 generates a rectangular voltage signal whose amplitude is inverted between +K and −K at a time interval of −1H as shown in FIG. 3(b). Such an offset voltage signal ±K is added in the addition circuit 4 to the color difference signal B−Y. Consequently, the result of synthesis of the output of the two balanced modulators 5 and 6 provides a composite signal Ec(t) expressed as follows:

$$Ec(t) = E_{R-Y}(t)\cos \omega c t + E_{B-Y}(t) \sin \omega c t \pm K \sin \omega c t \quad (4)$$

where K is a constant.

The third member, $\pm K \sin \omega c t$, on the right represents the continuous reference phase signal. In order to identify the order of phase inversion of the reference phase signal, an index pulse signal ±K as shown in FIG. 3(c) is added to the other color difference signal R−Y. It will be seen that the index pulse signal ±K appears in the horizontal blanking period HBLK and has its polarity inverted at a time interval of 1H. The offset voltage signal ±K is added to the color difference signal B−Y because red color requires a greater dynamic range than blue from the visual viewpoint. However, this offset voltage signal ±K may theoretically be added to any of the color difference signals. For identifying the order of phase inversion, any desired identification method employed in, for example, the color-difference line-sequential FM type of recording and reproduction may be utilized.

The composite signal Ec(t) composed of the quadrature two-phase balance-modulated color signal $E_{BB}(t)$ and the reference phase signal $\pm K \sin\omega c(t)$ is then multiplexed with the carrier luminance signal $E_y(t)$ which is an output from an angular modulator 12, and recorded in a magnetic recording medium such as a magnetic disk or tape by the magnetic head 14. A multiplex signal $E_M(t)$ is expressed as follows:

$$E_M(t) = E_Y(t) + E_c(t) \quad (5)$$
$$= E_Y(t) + E_{R-Y}(t)\cos\omega c t + E_{B-Y}(t)\sin\omega c t \pm K\sin\omega c t$$

where $E_Y(t)$ is the voltage signal wave of Y.

The reproducing system will now be described.
The output of a reproducing magnetic head 20 is passed through a high pass filter 21 and a low pass filter 24 after being amplified. The carrier luminance signal $E_Y(t)$ appears at the output of the high-pass filter 21, while the composite signal $E_c(t)$ composed of the quadrature two-phase balance-modulated color signal and the reference phase signal appears at the output of the low-pass filter 24. The carrier luminance signal $E_Y(t)$ is applied to a limiter 22 where level variation is eliminated, and then demodulated by an angle demodulator 23 depending on FM or PM. The composite signal $E_c(t)$ is separated into the quadrature two-phase balance-modulated color signal $E_{BB}(t)$ and the reference phase signal $K\sin\omega c t$ by a separation circuit of comb filter type composed of a 1H delay line 25, an addition circuit 26, and a subtraction circuit 27. For separation, the strong vertical correlation between adjacent horizontal scanning lines in the color signal is utilized, as will be numerically expressed hereinunder.

Assuming that the composite signal $E_{ci}(t)$ corresponding to an i-th horizontal scanning line is expressed as $$E_{ci}(t) E_{R-Y}{}^i(t)\cos\omega c t + E_{B-Y}{}^i(t)\sin\omega c t + K\sin\omega c t \quad (6)$$

The composite signal $E_{ci+1}(t)$ corresponding to an (i+1)th horizontal scanning line becomes as follows:

$$E_{ci+1}(t) = E_{R-Y}{}^{i+1}(t)\cos\omega c t + E_{B-Y}{}^{i+1}(t)\sin\omega c t - K\sin\omega c t \quad (7)$$

Incidentally, due to the strong vertical correlation between adjacent horizontal scanning lines in the video signal, the following relations hold:

$$E_{R-Y}{}^{i+1}(t) \approx E_{R-Y}{}^i(t)$$
$$E_{B-Y}{}^{i+1}(t) \approx E_{B-Y}{}^i(t) \quad (8)$$

Thus, the equation (6) can be replaced by the following equation (9):

$$E_{ci}(t) = E_{R-Y}{}^{j+1}(t)\cos\omega ct + E_{B-Y}{}^{j+1}(t\omega ct + K\sin\omega c(t)) \quad (9)$$

When the output signal of the 1H delay line 25 is added in the addition circuit 26 to the input signal to compute the addition of the equation (9) and the equation (7), the following relation (10) holds:

$$2[E_{R-Y}{}^{j+1}(t)\cos\omega ct + E_{B-Y}{}^{j+1}(t)\sin\omega ct] \quad (10)$$

Thus, the quadrature two-phase balance-modulated color signal can be separated.

On the other hand, when the input signal of the 1H delay line 25 is subtracted in the subtraction circuit 27 from the output signal to compute the subtraction of the equation (9) from the equation (7), the following is obtained:

$$+2K\sin\omega ct$$

or the synchronous detection signal for the balance-modulated color signal portion including the color difference signal B−Y can be separated. Further, when the output of the subtraction circuit 27 is delayed by 90° in the phase shifter 36, the following is obtained:

$$+2K\cos\omega ct$$

or the synchronous detection signal for the balance-modulated color signal portion including the color difference singal R−Y is obtained. Although the polarity of the output signal of the addition circuit 26 is fixed, that of the output signal of the subtraction circuit 27 is inverted at a time interval of 1H. That is, the result of subtraction $E_{ci+1}(t) - E_{ci}(t)$ provides the output $-2K\sin\omega ct$ while the result of subtraction $E_{ci+2}(t) - E_{ci+1}(t)$ provides the output $+2K\sin\omega ct$. By inverting the output $2K\sin\omega ct$ of the subtraction circuit 27 in the inversion circuit 4 at a time interval of 1H, the synchronous detection signal $$+2K\sin\omega ct$$

is obtained having the same polarity as that of the separated quadrature two-phase balance-modulated color signal. It the timing of polarity inversion goes wrong, the demodulated color difference signals will have the opposite polarities resulting in a color error. To avoid this, an inversion control pulse signal 46 whose polarity is inverted at a time interval of 1H at an inversion pulse generator 38 is generated from an inversion pulse generator 38 on the basis of the detected phase difference signal 45 appearing from the PLL circuit 39 so as to control the switching operation of the inversion circuit 34 by the inversion control pulse signal 46. The operation is described in further detail below, and the index pulse signal superposed on the color difference signal R−Y during recording is utilized for this purpose. A limiter 35 is provided to prevent occurrence of level variations in the synchronous detection signal.

The horizontal synchronizing signal is separated and extracted from the reproduced luminance signal in a synchronizing separation circuit 37 and is applied to a gate pulse generator 40 which generates a gate pulse signal appearing in the horizontal blanking period HBLK as shown in FIG. 3(d). This gate pulse signal is utilized to separate and extract the burst signal during the horizontal blanking period from the composite signal $E_c(t)$ appearing at the output of the low-pass filter 24. Since the burst signal is composed of the reference phase signal $K\sin\omega ct$ and the balance-modulated wave $\pm K\cos\omega ct$ of the index pulse signal, its phase changes at a time interval of 1H although its angular frequency is $\omega c$. This burst signal making such a phase change is represented by $\sin(\omega ct \pm \pi/4)$ as shown in FIG. 3(e). FIG. 4 shows the phase relation of the index pulse signal. A PLL circuit 39 includes a phase difference detector 39a, a phase compensation circuit 39b and a voltage controlled oscillator (VCO) 39c. In response to the application of the burst signal $\sin(\omega ct \pm \pi/4)$, the PLL circuit 39 generates a signal $\sin\omega ct$, and the output 45 of its phase difference detector 39a has a waveform shown in FIG. 3(f). Since the polarity of the detected phase difference signal 45 having such a waveform changes in correspondence with that of the index pulse signal, the inversion circuit 34 operates with accurate timing when the inversion control pulse signal 46 generated from the pulse generator 38 has a rectangular waveform whose polarity is inverted at a time interval of 1H as shown in FIG. 3(g).

As described above, synchronous detection of the quadrature two-phase balance-modulated color signal with the signal $\cos\omega ct$ demodulates the color difference signal R−Y, and synchronous detection of the color signal with the signal $\sin\omega ct$ demodulates the color difference signal B−Y.

In this case, the quadrature two-phase balance-modulated color signal is controlled of its level by the AGC circuit 28 which in turn is controlled by the output signal of the level detector 29 which envelope-detects the reference phase signal outputted from the subtractor 27. Since the reference phase signal is a continuous wave, it is possible to achieve a complete AGC. Further, since the reference phase signal is recorded in multiplex with the quadrature two-phase balance-modulated color signal and its frequency is the same as that of the subcarrier, its phase change, if any, attributable to a time base variation that may occur in the course of recording and reproduction is almost the same as that of the color signal. Therefore, since the synchronous detection signal produced from the reference phase signal is also subjected to a phase change which is substantially the same as that of the quadrature two-phase balance-modulated color signal, the demodulated color difference signals R−Y and B−Y are not adversely affected by the time base variation, and the hue deviation attributable to the time base variation is minimized.

The luminance signal Y and the two color difference signals R−Y, B−Y thus demodulated are applied to a unit such as a picture display unit. In the reproducing system shown in FIG. 2, the subcarrier of 3.58 MHz produced by an oscillator 44 is applied to an encoder 43 in which the carrier of 3.58 MHz is subjected to quadrature two-phase balance modulation by the two color difference signals R−Y and B−Y, and the so-called carrier chrominance signal thus obtained is superposed on the luminance signal to output NTSC signal.

According to the above mentioned embodiment, the reference phase signal required for demodulation is frequency-interleaved and multiplexed as a continuous signal. Thus the reference phase signal has the same variation despite the time base variation, and enables cancellation during demodulation as well as a complete AGC based on the reference phase signal.

As is well known, when a carrier luminance signal is to be magnetically recorded in the frequency zone higher than the quadrature 2-phase balance-modulated color signals, $2\omega_c$ becomes generated during demodulation of the carrier luminance singal by distortion of third order due to the non-linearity of the electro-magnetic conversion system. General solution to this problem is to frequency-interleave $2\omega_c$ with the carrier luminance signal so as to make it inconspicuous; and the following relation holds.

$$\omega_c = \frac{2n+1}{4}\omega_H$$

Figure 6:
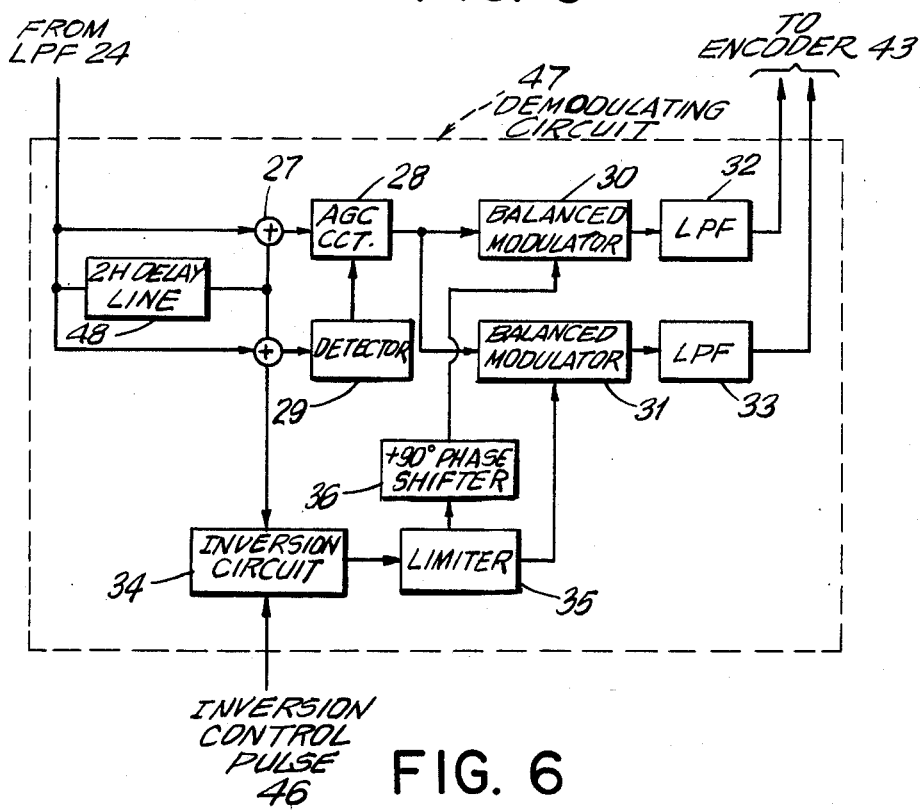
FIG. 6 is a block diagram showing another form of the circuit for demodulating the quadrature two-phase balance modulated color signal.

The embodiment of the present invention based on the above theory is now explained. In the embodiment, the polarity of reference phase signal is inverted at a time interval of 2H to frequency-interleave the reference phase signal with the quadrature two-phase balance-modulated color signal. The recording system is the same as that shown in FIG. 1 except for generation of the offset voltage and index pulse signal. A demodulating circuit section 47 in the reproducing system shown in FIG. 2 is preferably modified to a structure as shown in FIG. 6. FIG. 7 shows the relation between the offset voltage and the index pulse signal. Assuming that the composite signal $E_{ci}(t)$ of the reference phase signal and the quadrature two-phase balance-modulated color signal on the i-th horizontal scanning line is expressed as $$E_{ci}(t) = E_{R-Y}{}^i(t)\cos\omega ct + E_{B-Y}{}^i(t)\sin\omega ct + K\sin\omega ct \quad (11)$$

the composite signal $E_{ci+1}(t)$ on the (i+1)th horizontal scanning line is expressed as $$E_{ci+1}(t) = E_{R-Y}{}^{i+1}(t)\cos\omega ct + E_{B-Y}{}^{i+1}(t)\sin\omega ct \quad (12)$$

However, since $$\omega_c = \frac{2n+1}{4}\omega_H \quad (13)$$

and assuming that n is an even number, the following relation stands:

$$E_{ci+1}(t)_c = -E_{R-Y}{}^{i+1}(t)\sin\omega ct + E_{B-Y}{}^{i+1}(t)\cos\omega ct + K\cos\omega ct \quad (14)$$

Thus, the composite signals $E_{ci+j(t)c}$ on the (i+j)th horizontal scanning lines are expressed as follows:

$$E_{ci+2}(t)_c = -E_{R-Y}{}^{i+2}(t)\cos\omega ct - E_{B-Y}{}^{i+2}(t)\sin\omega ct + K\sin\omega ct \quad (15)$$

$$E_{ci+3}(t)_c = E_{R-Y}{}^{i+3}(t)\sin\omega ct - E_{B-Y}{}^{i+3}(t)\cos\omega ct + K\cos\omega ct \quad (16)$$

$$E_{ci+4}(t)_c = E_{R-Y}{}^{i+4}(t)\cos\omega ct = E_{i+4}(t)\sin\omega ct + K\sin\omega ct \quad (17)$$

$$E_{ci+5}(t)_c = -E_{R-Y}{}^{i+5}(t)\sin\omega ct + E_{B-Y}{}^{i+5}(t)\cos\omega ct + K\cos\omega ct \quad (18)$$

On the other hand, due to the strong vertical correlation in the video signal, the following relations hold:

$$E_{R-Y}^{i+2}(t) \approx E_{R-Y}^{i}(t),\ E_{R-Y}^{i+3}(t) \approx E_{R-Y}^{i+1}(t) \quad (19)$$

$$E_{R-Y}^{i+4}(t) \approx E_{R-Y}^{i+2}(t),\ E_{R-Y}^{i+5}(t) \approx E_{R-Y}^{i+3}(t)$$

-continued $$E_{B-Y}^{i+2}(t) \approx E_{B-Y}^{i}(t),\ E_{B-Y}^{i+3}(t) \approx E_{B-Y}^{i+1}(t) \quad (20)$$

$$E_{B-Y}^{i+4}(t) \approx E_{B-Y}^{i+2}(t),\ E_{B-Y}^{i+5}(t) \approx E_{B-Y}^{i+3}(t)$$

Therefore, when the output signal of a 2H delay line 48 is subtracted in the subtraction circuit 27 from the input signal, the quadrature two-phase balance-modulated color signal can be separated as shown below. Subtraction of the equation (11) from the equation (15) provides $$-2[E_{R-Y}{}^{i+2}(t)\cos\omega ct + E_{B-Y}{}^{i+2}(t)\sin\omega ct] \quad (21)$$

Subtraction of the equation (14) from the equation (16) provides $$2[E_{R-Y}{}^{i+3}(t)\sin\omega ct - E_{B-Y}{}^{i+3}(t)\cos\omega ct] \quad (22)$$

Subtraction of the equation (15) from the equation (17) provides $$2[E_{R-Y}{}^{i+4}(t)\cos\omega ct + E_{B-Y}{}^{i+4}(t)\sin\omega ct] \quad (23)$$

Subtraction of the equation (16) from the equation (18) provides $$2[-E_{R-Y}{}^{i+5}(t)\sin\omega ct + E_{B-Y}{}^{i+5}(t)\cos\omega ct] \quad (24)$$

On the other hand, when the output signal of the 2H delay line 48 is added in the addition circuit 26 to the input signal, the synchronous detection signal can be separated as well. Addition of the equation (11) to the equation (15) provides $$2K\sin\omega ct \quad (25)$$

Addition of the equation (14) to the equation (16) provides $$2K\cos\omega ct \quad (26)$$

Addition of the equation (15) to the equation (17) provides $$2K\sin\omega ct \quad (27)$$

Addition of the equation (16) to the equation (18) provides $$2K\cos\omega ct \quad (28)$$

Although the color difference signals B−Y $$-E_{B-Y}{}^{i+2}(t),\ -E_{B-Y}{}^{i+3}(t),\ E_{B-Y}{}^{i+4}(t),\ +E_{B-Y}{}^{i+5}(t),$$

can be sequentially demodulated when the output signal of the addition circuit 26 is directly used for the synchronous detection of the output signal of the subtraction circuit 27, the polarity of the signals B−Y becomes inverted at a time interval of 2H, resulting in a color error. Therefore, the polarity of the output signal of the addition circuit 26 is inverted at a time interval of 2H in the inversion circuit 34 to provide the B−Y demodulation signal. For demodulating the color difference signals R−Y, the phase of the output signal of the inversion circuit 34 is delayed by 90° in the phase shifter 36, and such a signal is used to synchronously detect the output signal of the subtraction circuit 27. When the inversion circuit 34 operates with wrong timing, a color error results. Therefore, the inversion control pulse signal 46 applied to the inversion circuit 34 is produced as described below. The offset voltage superposed on the color difference signal B−Y during recording is changed over between +K and −K at a time interval of 2H as shown in FIG. 7(b), and the index pulse signal superposed on the color difference signal R−Y is also changed over between +K and −K at a time interval of 2H as shown in FIG. 7(c). The gate circuit 41 applying the burst signal to the PLL circuit 39 is triggered by a timing pulse signal having a pulse period of 2H as shown in FIG. 7(d). The rest is the same as that described with reference to FIGS. 1 to 3 is generally similar to that above described when n is an odd number.

It will be understood from the foregoing description of preferred embodiments of the present invention that color information can entirely be recorded without partial drop-out of information as in the color-difference line-sequential FM type recording and reproduction, and a time base variation or a level variation, if any, does not substantially lead to the deviation of hue or color saturation of the low-band conversion type recording and reproduction. Therefore, a color video signal of high picture quality can be recorded and reproduced. While the foregoing description refers to application of the present invention to a magnetic picture recording / reproducing apparatus the present invention is equally applicable to recording and reproduction of still and moving pictures. The present invention is also applicable to various kinds of color video signal recording systems such as an optical video disk apparatus.

The relation between the recording and reproducing system of the present invention and the desired high recording density of magnetic records is now discussed. In many of magnetic picture recording and reproducing apparatus presently in use, the inclined azimuth arrangement is used for guardband-less recording. The inclined azimuth arrangement can also be employed in the present invention system.

In the case of phase modulation (PM) of the luminance signal Y, the techniques disclosed in Japanese Patent Publication No. 56-51406 (1981) and Japanese Patent Application Laid-open No. 53-41126 (1978) may be utilized. The conditions are such that the modulation index mp is selected to be less than or equal to a certain value as mp≦1.3, thereby suppressing appearance of secondary and higher sideband components, the recorded positions of the vertical synchronizing signal on adjacent tracks of a magnetic recording medium are at least aligned (V alignment), and preferably the recorded positions of the horizontal synchronizing signal on the adjacent tracks are also aligned (H alignment). The conditions are also such that the phases of the center frequency of the PM luminance signal are aligned on the adjacent tracks, the center frequencies of the quadrature two-phase balance-modulated color signal are aligned on the adjacent tracks, and the phase inversions (o, π) of the reference phase signal at the time interval of 1H or 2H are aligned on the adjacent tracks of the magnetic recording medium. When after the color video signal satisfying the above conditions is recorded at a high recording density in a guardband-less fashion or partly overlapping fashion, two or more tracks are scanned by the reproducing head, the color video signal can be reproduced without beat interference, crosstalk or out-of-synchronization by virtue of the strong vertical correlation between adjacent horizontal scanning lines in the color video signal.

What is claimed is:

1. A color video signal recording system comprising means for producing a quadrature two-phase balance-modulated color signal by subjecting a subcarrier to quadrature twophase balanced modulation by two color signals, means for producing a demodulation-purpose reference phase signal which has the same frequency as that of the subcarrier and which is to be frequency-interleaved with said quadrature two-phase balance-modulated color signal, means for multiplexing said quadrature two-phase balance-modulated color signal and said demodulation-purpose reference phase signal together with a..carrier luminance signal, and means for recording said multiplex signal.

2. The color video signal recording system as claimed in claim 1 wherein the quadrature two-phase balance-modulated color signal and the demodulation-purpose reference phase signal are selected to have the frequency lower than the lower band of the carrier luminance signal.

3. A system for reproducing a color video signal recorded on a recording medium, said color video signal being provided by multiplexing a quadrature two-phase balance-modulated color signal obtained by subjecting a subcarrier to quadrature two-phase balanced modulation by two color signals and a demodulation-purpose reference phase signal which has the same frequency as that of said subcarrier and which is to be frequency-interleaved with said quadrature two-phase balance-modulated color signal together with a carrier luminance signal, said reproducing system comprising means for separating said carrier luminance signal, said multiplexed quadrature 2-phase balancemodulated color signal and said demodulation-purpose phase signal, and means for demodulating said quadrature 2-phase balance-modulated color signals on the basis of the separated reference phase signal.

* * * * *